No. 685,862. Patented Nov. 5, 1901.
J. B. PAINE.
SPEED CHANGING AND POWER TRANSMITTING MECHANISM.
(Application filed Feb. 18, 1901.)
(No Model.) 3 Sheets—Sheet 1.
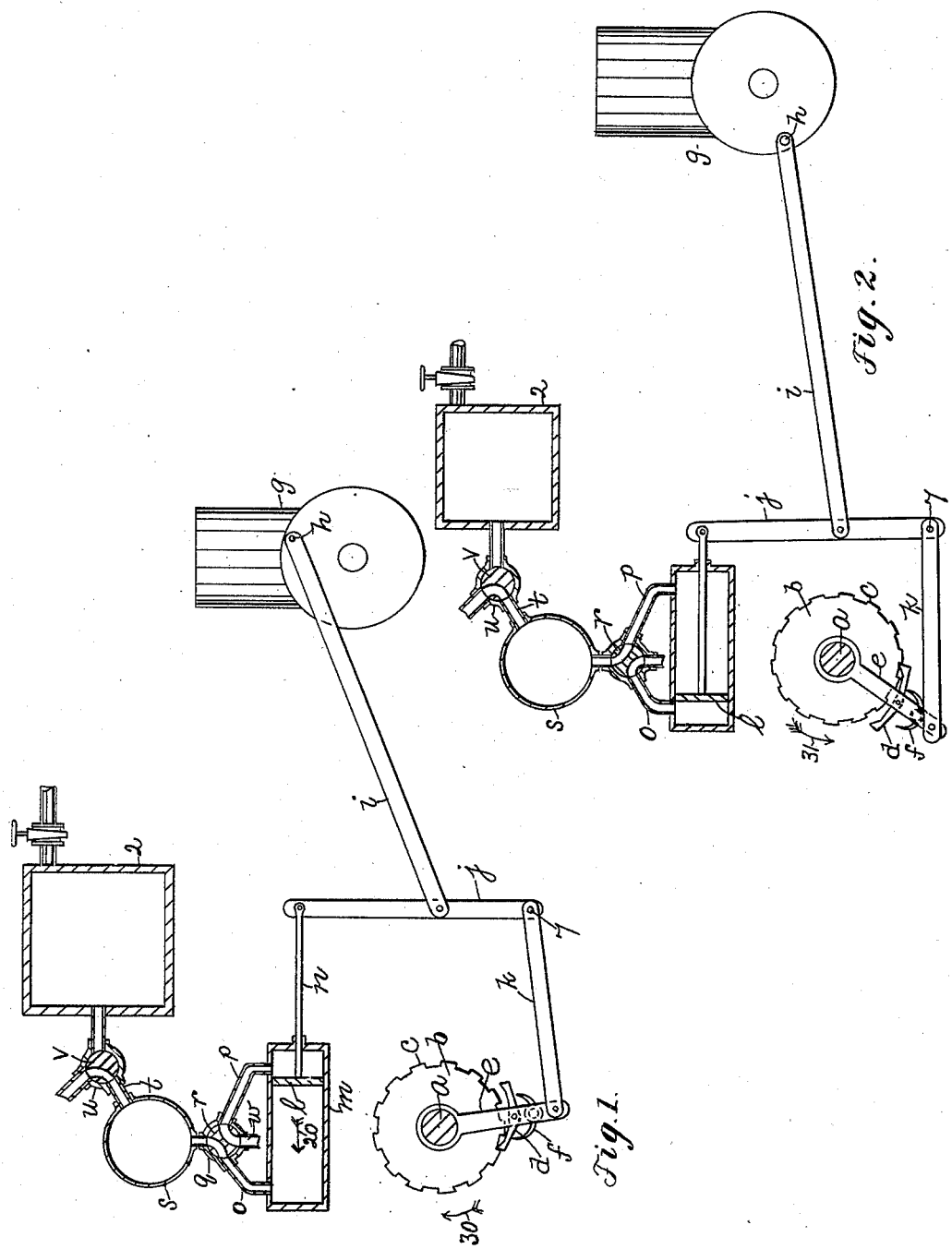
Witnesses.
C. H. Garnett.
J. Murphy.
Inventor:
John B. Paine
by Jas. H. Churchill
atty.

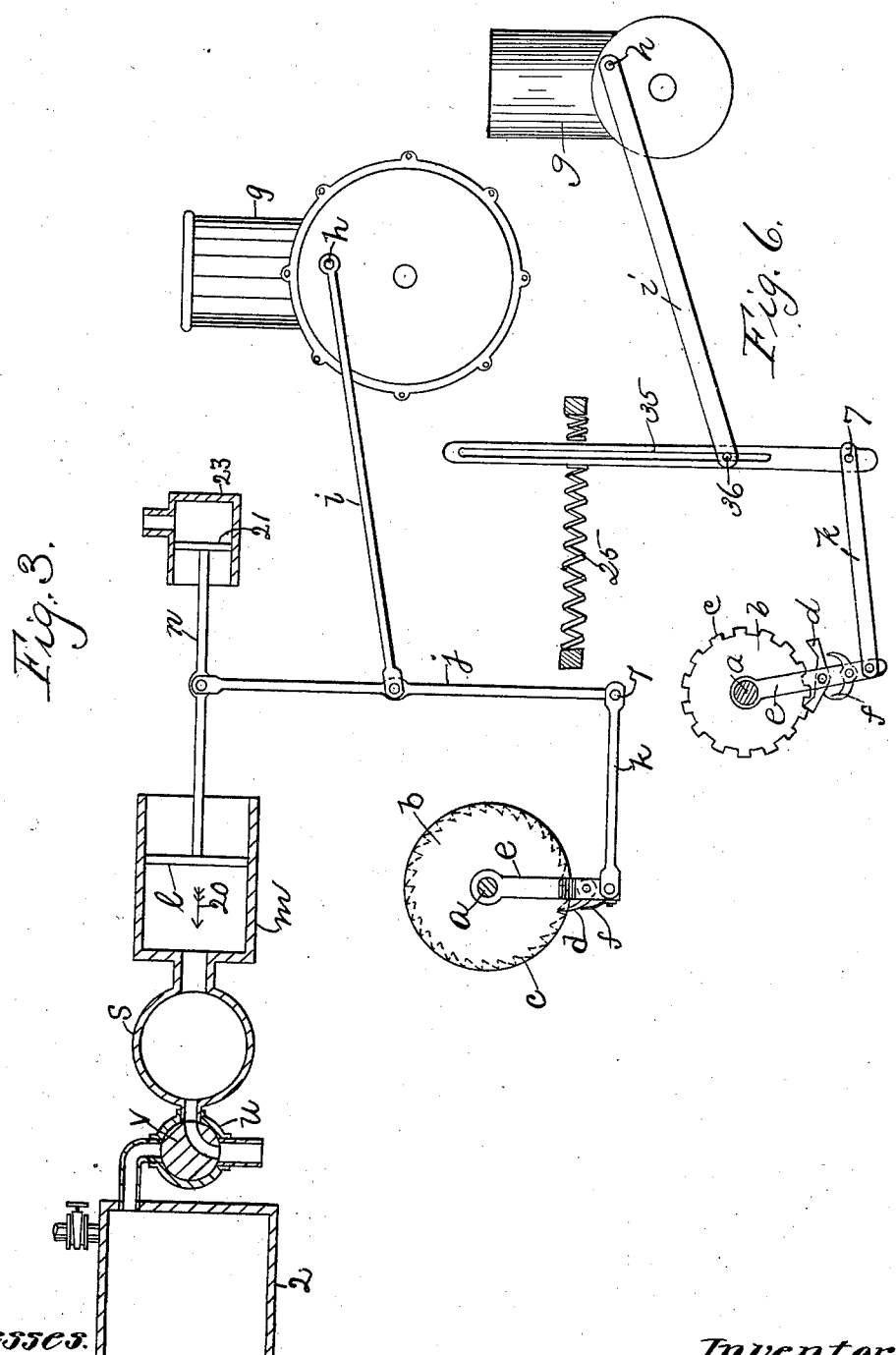

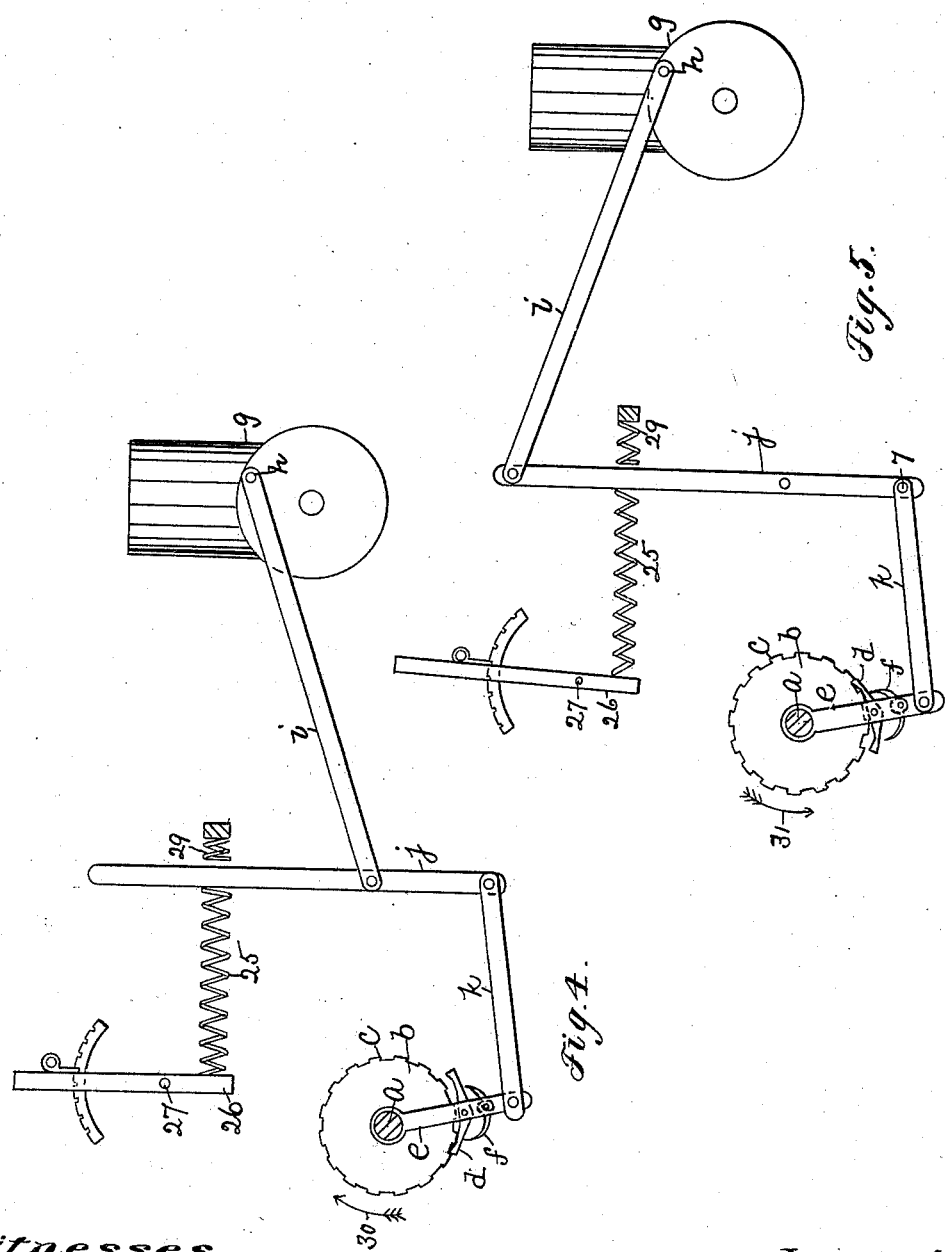

UNITED STATES PATENT OFFICE.

JOHN B. PAINE, OF WESTON, MASSACHUSETTS.

SPEED-CHANGING AND POWER-TRANSMITTING MECHANISM.

SPECIFICATION forming part of Letters Patent No. 685,862, dated November 5, 1901.

Application filed February 18, 1901. Serial No. 47,786. (No model.)

*To all whom it may concern:*

Be it known that I, JOHN B. PAINE, a citizen of the United States, residing in Weston, in the county of Middlesex and State of Massachusetts, have invented an Improvement in Speed-Changing and Power-Transmitting Mechanism, of which the following description, in connection with the accompanying drawings, is a specification, like characters on the drawings representing like parts.

This invention relates to a speed-changing and power-transmitting mechanism in which a secondary member is driven from a primary member and the speed of said secondary member is varied with relation to the speed of the primary member by regulating the amount of power of the primary member which is applied to the secondary member.

The invention is especially adapted, among other uses, to be employed on automobile vehicles.

In the embodiment of the invention herein shown the secondary member, which may be a rotatable device on a shaft of the vehicle, is connected with a reciprocating rod actuated by a suitable engine or motor and constituting the primary member by a lever or levers and to a third member, which may be designated the "regulating member," whereby power delivered by said primary member in the form of a reciprocating motion with a harmonically-varying velocity may be transmitted to the secondary member as a rotary motion with an approximately uniform or uniformly accelerating angular velocity. This third member may also be so constructed and connected to the primary and secondary members that the pressure or torque applied to, and hence the speed of, said secondary member may be controlled within the limits of each particular machine by the operator. This regulating member may be a spring the strength of which or the leverage by which it acts is suitably controlled, or it may be a piston movable in a cylinder containing a compressible fluid under pressure, which may be suitably controlled. These and other features of this invention will be pointed out in the claims at the end of this specification.

Figure 1 is a section and elevation of one form of speed-changing and power-transmitting mechanism embodying this invention; Fig. 2, a view similar to Fig. 1 with the parts reversed; Figs. 3 to 6, inclusive, modifications to be referred to.

Referring to Fig. 1, $a$ represents a rotatable shaft, which may be a shaft of an automobile vehicle of any suitable construction, the said shaft constituting the driven or secondary member of the speed-changing device. As shown in Fig. 1, the shaft $a$ has fast on it a ratchet wheel or disk $b$, with the teeth $c$ of which engages one end of a pawl $d$, pivoted to a lever or arm $e$, hung upon the shaft $a$, the pawl being acted upon by a spring $f$.

The secondary member $a$ is driven by the primary member, which is a rod $i$, actuated by a crank $h$ on an engine or motor $g$, the rod $i$ being connected to a floating lever $j$, which has one end connected to the pawl-carrying lever $e$ by a link or rod $k$ and which has its opposite end connected to the regulating third member, by which the amount of power of the primary member which is applied to the secondary member may be controlled by the operator. The third member, as shown in Fig. 1, is a piston $l$, movable in a cylinder $m$ and having a rod $n$, to which the floating lever is pivotally connected.

The cylinder $m$, as shown in Fig. 1, is closed and has its opposite ends connected by passages $o$ $p$ with a valve-casing $q$, containing a valve $r$, adapted to connect either passage $o$ $p$ with a clearance-chamber $s$, connected by a pipe $t$ to a valve-casing $u$, containing a valve $v$, and connected to a vessel or tank 2, containing air or other compressible fluid under pressure.

The valve $r$ is adapted to connect either of the passages $o$ $p$ with the clearance-chamber $s$ and simultaneously to connect the other of said passages with the port $w$, leading to the atmosphere. The valve $v$ is designed in one position to connect the clearance-chamber with the pressure-tank and in another position to cut off the pressure-tank and connect the clearance-chamber to the atmosphere.

The valves $r$ and $v$ in practice may be operated in any suitable manner.

In operation differences in the constantly-varying ratios between the velocity of the reciprocating motion of the primary member and the angular velocity imparted to the secondary member are adjusted by the third member, and as this third member is under the control of the operator therefore the pressure applied to rotate the secondary member is controllable by the operator.

The operation may be more clearly understood by assuming that the secondary member $a$ is a shaft of an automobile. In this case, with the valves $r v$ in the positions shown in Fig. 1, both ends of the cylinder are in communication with the atmosphere, and it is evident that the rotation of the crank-shaft of the engine or motor $g$ will not move the secondary member, but will move the lever $j$ about the point 7 as a fulcrum and reciprocate the piston $l$ in the cylinder $m$. When, however, the valve $v$ is turned so as to connect the clearance-chamber $s$ with the pressure-tank 2, compressible fluid under pressure is admitted into the cylinder through the passage $o$. The compressible fluid thus admitted into the cylinder resists the movement of the piston $l$ in the direction indicated by arrow 20 and assists said piston on its movement in the reverse direction, thus regulating the pressure applied to the secondary member by the primary member, for it will be seen that the motion of the engine, which is transmitted by the primary member $i$ to the lever $j$, will not move the secondary member or shaft $a$ until the pressure on the piston $l$, taken in connection with the leverage through which it is exerted, is sufficient to overcome the resistance offered by the secondary member. Hence by varying the pressure in the cylinder $m$, which pressure is controlled by the valve $v$ in the present instance, the pressure applied to the secondary member may be varied, and in the case of automobiles the variation of the pressure in the cylinder regulates the speed of rotation of the shaft $a$, and consequently regulates the speed of the vehicle, other conditions being constant.

With the speed-changing mechanism shown in Fig. 1 the primary member may be kept in motion at full speed while the vehicle is stationary, which is effected by turning the valve $v$ so as to cut off the pressure-tank and connect the clearance-chamber with the atmosphere, as represented in Fig. 1. In this case all the motion of the primary member will be transmitted to the reciprocating piston $l$. When it is desired to start the vehicle in motion, the compressible fluid under pressure is admitted into the cylinder $m$, and by regulating the amount of fluid so admitted the speed of the secondary member may be controlled. By gradually increasing the pressure in the cylinder $m$ the pressure applied to the secondary member is increased, and the rotary movement of the secondary member is thereby increased until the carriage is running at full speed. In Fig. 1 the pressure is admitted into the cylinder through the passage $o$, and the shaft $a$ is rotated in the direction indicated by arrow 30; but by turning the valve $r$ into the position shown in Fig. 2 the pressure may be admitted into the cylinder through the passage $p$, and by reversing the pawl $d$ the shaft $a$ is rotated in the reverse direction, (indicated by the arrow 31.) In Fig. 3 the cylinder $m$ is open at one end and the piston-rod $n$ guided by small piston 21 in a dash-pot 23.

I may prefer to make the third or regulating member as a piston movable in a cylinder, but I do not desire to limit my invention in this respect, as the said regulating member may be a spring, as conventionally represented in Figs. 4 to 6, inclusive. In Fig. 4 the floating lever $j$ has attached to it one end of a spring 25, having its other end connected to a lever 26, pivoted at 27 and by which the resistance of the spring 25 may be varied to regulate the amount of power of the primary member which is applied to the secondary member.

In Fig. 4 is shown a cushion or buffer 29 for the lever to strike against.

In Fig. 5 I have represented the same construction as shown in Fig. 4, arranged to rotate the shaft $a$ in the reverse direction, which is effected by changing the connection of the rod $i$ with the lever from one side of the spring 25 to the other and reversing the pawl $d$.

In Fig. 6 I have shown an arrangement in which the spring 25 may be of constant strength, and the leverage through which it acts is made variable by providing a sliding connection between the primary member $i$ and the lever $j$, which may be effected, as represented in Fig. 6, by providing the lever with a slot 35, in which the pin 36 on the rod $i$ is moved. By moving the pin 36 from the position shown in Fig. 6 toward the point at which the spring 25 is connected to the lever $j$ the leverage is changed while the secondary member is rotated in one direction, and by carrying the pin 36 beyond the point at which the spring is connected to the lever $j$ the secondary member is reversed and the leverage may be changed by moving the pin toward or away from the point of connection referred to.

I have herein illustrated my invention in various forms, but do not desire to limit my invention to the mechanical constructions illustrated.

I claim—

1. In an apparatus of the class described, the combination with a primary member having a reciprocating motion, and a secondary or driven member having an approximately uniform velocity or an approximately uniformly accelerating velocity, of a lever operatively connected to the said primary and secondary members and an elastic medium acting on said lever for regulating the amount of power of the primary member which is applied to the secondary member, for the purpose set forth.

2. In an apparatus of the class described, the combination with a primary member having a reciprocating motion, of a secondary or driven member having an approximately uniform velocity or an approximately uniformly accelerating velocity, of a lever operatively connected at one point with the secondary member and connected at a second point with a third member, and connected at a third point with the primary member, said third member, and means for controlling the operation of said third member to regulate the pressure applied to the secondary member, substantially as and for the purpose specified.

3. In an apparatus of the class described, the combination with a primary member having a reciprocating motion, of a secondary or driven member having an approximately uniform velocity or an approximately uniformly accelerating velocity, of a third member comprising a piston having a piston-rod connected with said primary and secondary members, a cylinder in which said piston reciprocates, a source of supply for a compressible fluid under pressure, and means for controlling the admission of said compressible fluid under pressure into said cylinder, substantially as described.

4. In an apparatus of the class described, an engine or motor provided with a crank, a rotatable device, a lever, a connecting-rod joining said crank with the said lever, means for connecting said lever with the said rotatable device, a cylinder, a piston movable therein and having its piston-rod connected with said lever, a pressure tank or vessel containing a compressible fluid under pressure and communicating with said cylinder, and means for controlling the admission of the fluid under pressure into said cylinder, substantially as and for the purpose specified.

5. In an apparatus of the class described, the combination with a primary member having a reciprocating motion, of a secondary member having a rotary motion, a lever intermediate of said members to transmit power from the primary member to said secondary member, and means acting on said lever for regulating, while the primary member is in motion, the amount of power of the primary member which is applied to the secondary member, for the purpose specified.

In testimony whereof I have signed my name to this specification in the presence of two subscribing witnesses.

JOHN B. PAINE.

Witnesses:
JAS. H. CHURCHILL,
J. MURPHY.